Nov. 11, 1969  L. COFFMAN  3,477,212
FERTILIZER SPREADER ATTACHMENT FOR ROTARY POWER MOWER
Filed July 19, 1967  3 Sheets-Sheet 1

Leby Coffman

Nov. 11, 1969   L. COFFMAN   3,477,212
FERTILIZER SPREADER ATTACHMENT FOR ROTARY POWER MOWER
Filed July 19, 1967   3 Sheets-Sheet 3

3,477,212
FERTILIZER SPREADER ATTACHMENT FOR ROTARY POWER MOWER
Leroy Coffman, 4828 Wedgeview, Hurst, Tex. 76053
Filed July 19, 1967, Ser. No. 654,635
Int. Cl. A01d 75/00, 55/18
U.S. Cl. 56—25.4                    7 Claims

ABSTRACT OF THE DISCLOSURE

Specific improvements in a fertilizer spreader attachment for use with a rotary-type power lawn mower of conventional design having blades rotatable about a vertical axis, and having a housing, open on its under side, enclosing the blades and fitting closely around them, and having its lower edges in close proximity to the ground, and having wheels whereby it is supported.

---

This invention relates to a fertilizer spreader attachment for a rotary power mower, and it concerns more particularly certain specific improvements, as hereinafter described, in a fertilizer spreader attachment for use with a rotary-type power mower of conventional design having blades rotatable about a vertical axis, and having a housing, open on its under side, enclosing the blades and fitting closely around them, and having its lower edges in close proximity to the ground, and having wheels whereby it is supported.

The fertilizer spreader attachment of the invention comprises, in combination with a rotary-type power lawn mower as described, the combination of a generally rectangular hopper having a front, a back, two opposite sides, the lower portions of which converge, and a bottom formed in part by a comparatively narrow forward portion extending between the two opposite sides and partly by an inclined portion extending upwardly and rearwardly from the forward portion, a supporting bracket having means removably connecting it to the top of the housing and having the hopper pivotally and removably connected thereto, rearwardly of the hopper, below the inclined portion of the bottom thereof, the hopper having a discharge spout in fluid communication with an opening therefor in the forward portion of the bottom, and extending downwardly therefrom for engagement with an opening therefor in the top of the housing, through which it is passed, a rotatable shaft extending across the bottom of the hopper, above the forward portion thereof, journaled in openings therefor in the two opposite sides and extending beyond one side of the hopper, an agitator in the hopper rotatable with the shaft, and a wheel on the shaft in opposing, frictional engagement with one of the wheels of the mower, whereby the shaft is adapted to be driven in response to movement of the mower.

The arrangement is such that in use the weight of the hopper and its contents, acting on the shaft and the wheel thereon, serves to maintain the last mentioned wheel in frictional engagement with the opposing wheel of the mower.

The invention will be readily understood by referring to the following description and the accompanying drawing, in which.

Figure 1:
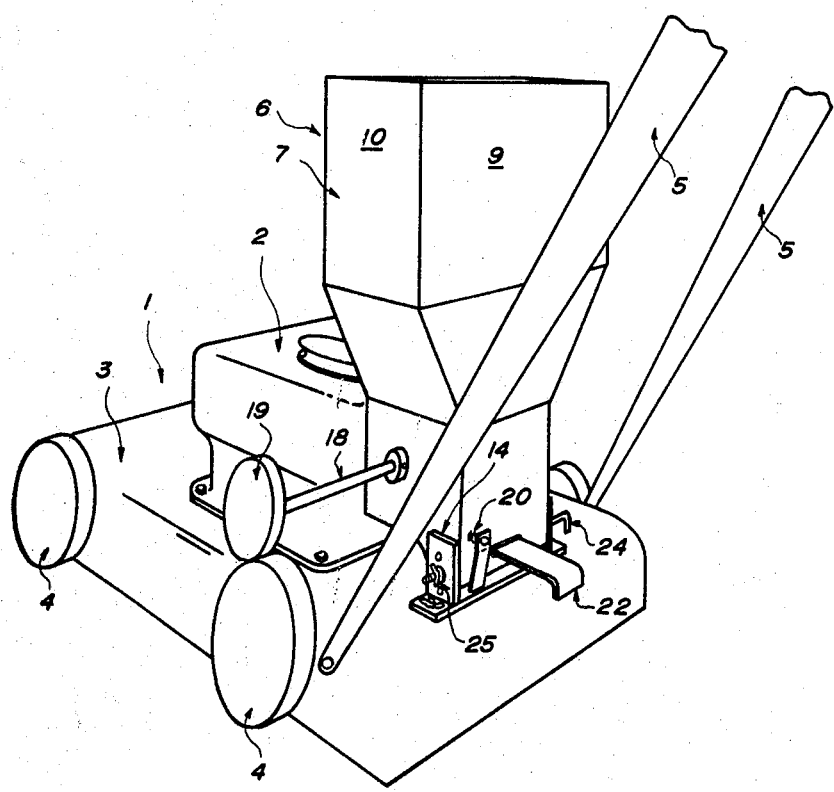
FIG. 1 is a perspective view of a gasoline engine driven, rotary power lawn mower having a fertilizer spreader attachment embodying the invention applied thereto.
Figure 4:
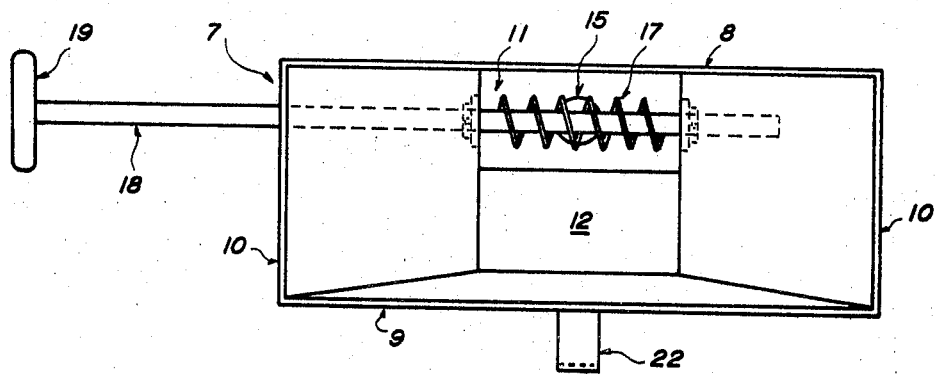
FIG. 4 is a top plan view of the fertilizer spreader attachment.
Figure 2:
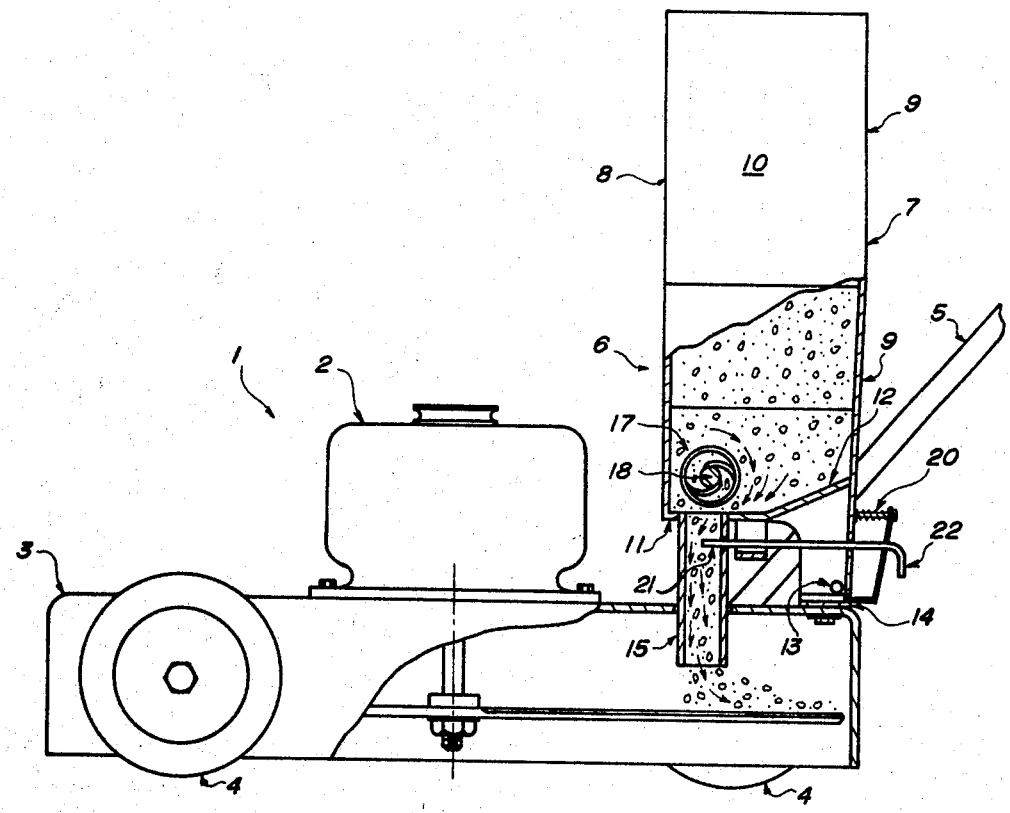
FIG. 2 is a side elevational view, partly broken away.
Figure 3:
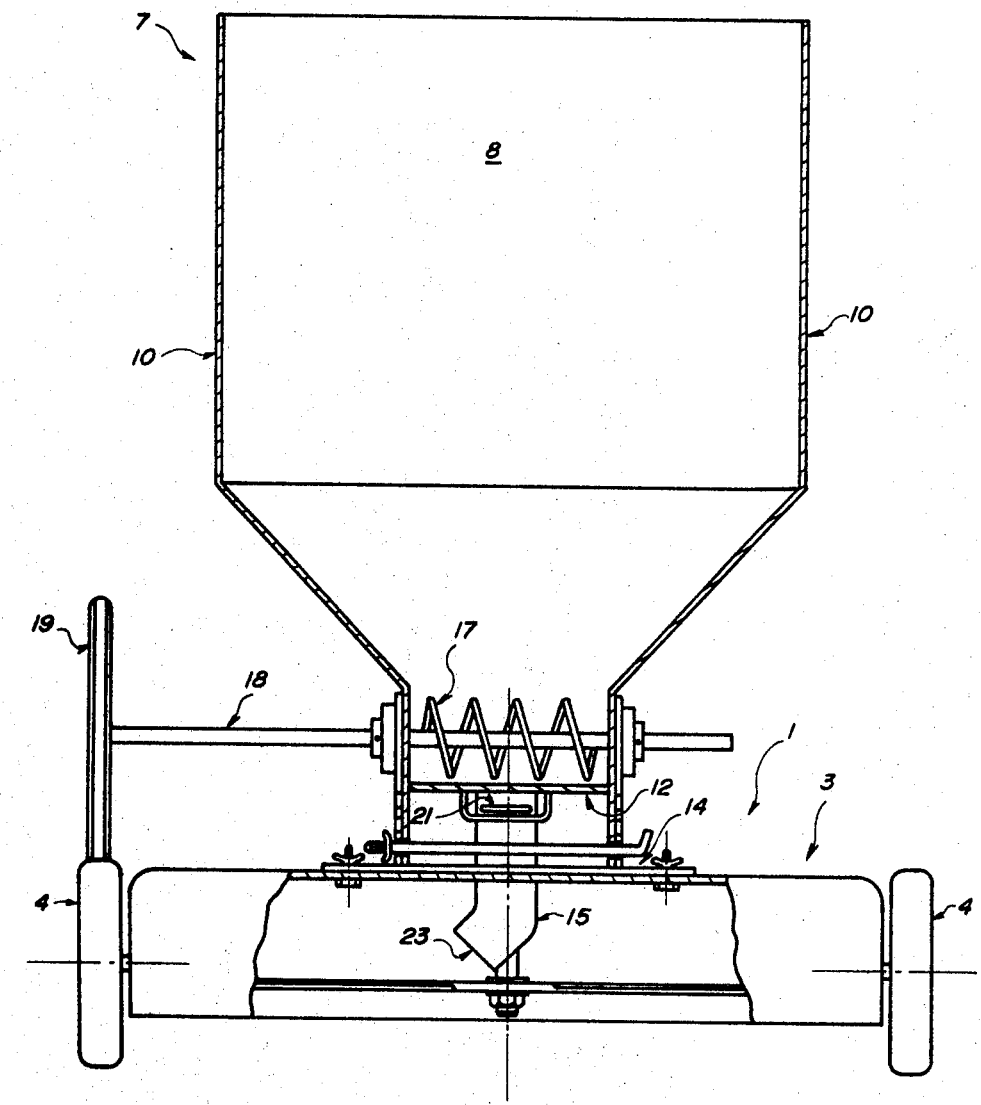
FIG. 3 is a sectional elevational view taken on the line 3—3 of FIG. 2.

Referring to FIGS. 1 and 2 of the drawing, the numeral 1 designates generally a conventional rotary-type power lawn mower, which as shown is driven by a gasoline engine 2 and has blades which are rotatable about a vertical axis. The blades of the mower 1 are enclosed within a housing 3, open on its under side, which fits closely around the blades and has its lower edges in close proximity to the ground. The mower 1 has wheels 4 whereby it is supported, and has an elongated handle 5 extending rearwardly thereof, for use in pushing it, in the usual manner.

The numeral 6 indicates generally a fertilizer spreader attachment embodying the invention, as hereinafter described, which as shown in FIGS. 1 and 2 is operatively positioned on the housing 3 of the mower 1, rearwardly thereof, between the engine 2 and the handle 5.

The fertilizer spreader attachment 6 includes a hopper 7, which is generally rectangular and has a front 8, a back 9, two opposite sides 10, the lower portions of which converge, and a bottom which is formed in part by a comparatively narrow forward portion 11 extending between the two opposite sides 10 and partly by an inclined portion 12 extending upwardly and rearwardly from the forward portion 11.

The hopper 7 is pivotally and removably connected, as at 13, rearwardly thereof, below the inclined portion 12 of the bottom thereof, to a supporting bracket 14 which in turn is removably connected to the top of the housing 3.

The hopper 7 has a discharge spout 15 which is in fluid communication with an opening therefor in the forward portion 11 of the bottom, and extends downwardly therefrom for engagement with an opening therefor in the top of the housing 3, through which it is passed.

An agitator element 17, which as shown comprises a helix, surrounds a shaft 18 extending across the bottom of the hopper 7, above the forward portion 11 thereof, and is rotatable therewith. The shaft 18 is journaled in openings therefor in the two opposite sides 10 and extends beyond one side of the hopper 7. The shaft 18 has a wheel 19 thereon for frictional engagement with one of the wheels 4 of the mower 1, whereby the shaft 18 is adapted to be driven in response to movement of the mower 1.

In use the weight of the hopper 7 and its contents, acting on the shaft 18 and the wheel 19, serves to maintain the wheel 19 in frictional engagement with the opposing wheel 4.

A resilient abutment 20, which is mounted on the supporting bracket 14, rearwardly of the hopper 7, is engageable with the back 9 of the hopper 7 to limit rearward movement of the hopper 7 about its pivot 13.

A slide valve 21, which has a handle 22 positioned rearwardly of the hopper 7, coacts with the discharge spout 15 to control the flow of material through it.

The discharge spout 15, which terminates at its lower end immediately above the blades of the mower 1, in the operative position of the fertilizer spreader attachment 6, is arranged to discharge material from the hopper 7 directly against the top sides of the rotating blades, adjacent their outer ends, whereby the material is uniformly distributed by the action of the blades.

In use the rotary motion of the blades creates a down draft, which assists in drawing material from the hopper 7, through the discharge spout 15, while at the same time directing such material downwardly, toward the ground, as well as radially outwardly, by the action of centrifugal force.

The discharge spout 15 has a side discharge 23 adjacent its lower end, facing in the direction of rotation of the blades of the mower 1, whereby material is caused to flow in the direction of rotation of the blades as it is discharged from the hopper 7, through the discharge spout 15.

The suction created by the rotary motion of the blades, acting on the material flowing from the hopper 7, through the discharge spout 15, together with the position of the side discharge 23, positively assure the continuous flow of such material and insure that the discharge spout 15 will remain open to the flow of material at all times.

The fertilizer spreader attachment 6 is readily separable from the mower 1 by removal of a hinge pin 24 whereby the hopper 7 is pivotally connected to the supporting bracket 14, as at 13. The hinge pin 24 is secured at one of its ends by a wing nut 25.

The opening in the top of the housing 3 for engagement by the discharge spout 15 advantageously may be closed by a hinged cover (not shown) when not in use.

Suitable bearings and thrust bearings are provided at the juncture of the shaft 18 with the openings therefor in the two opposite sides 10 of the hopper 7, whereby the shaft 18, which is passed through openings therefor in the two opposite sides 10, is rotatable relative thereto, and the weight of the hopper 7 and its contents is supported in part by the shaft 18 and the wheel 19 thereon, and whereby longitudinal displacement of the shaft 18 relative to the hopper 7 is prevented.

The thrust bearings are secured to the shaft 18 by set screws whereby the shaft 18 is adjustably positioned relative to the hopper 7 and is readily removable therefrom.

The invention may be modified in various ways without departing from the spirit and scope thereof.

I claim:

1. In combination with a rotary-type power lawn mower having blades rotatable about a vertical axis, and having a housing, open on its under side, enclosing the blades and fitting closely around them, and having its lower edges in close proximity to the ground, and having wheels whereby it is supported, the combination of a fertilizer spreader attachment, operatively positioned on the housing, comprising a generally rectangular hopper having a front, a back, two opposite sides, the lower portions of which converge, and a bottom formed in part by a comparatively narrow forward portion extending between the two opposite sides and partly by an inclined portion extending upwardly and rearwardly from the forward portion, a supporting bracket having means removably connecting it to the top of the housing and having the hopper pivotally and removably connected thereto, rearwardly of the hopper, below the inclined portion of the bottom thereof, the hopper having a discharge spout in fluid communication with an opening therefor in the forward portion of the bottom, and extending downwardly therefrom for engagement with an opening therefor in the top of the housing, through which it is passed, a rotatable shaft extending across the bottom of the hopper, above the forward portion thereof, journaled in openings therefor in the two opposite sides and extending beyond one side of the hopper, an agitator element in the hopper rotatable with the shaft, and a wheel on the shaft in opposing, frictional engagement with one of the wheels of the mower, whereby the shaft is adapted to be driven in response to movement of the mower, the arrangement being such that in use the weight of the hopper and its contents, acting on the shaft and the wheel thereon, serves to maintain the last mentioned wheel in frictional engagement with the opposing wheel of the mower.

2. The structure of claim 1, the agitator element consisting of a helix surrounding the shaft.

3. The structure of claim 1, and a resilient abutment on the supporting bracket, rearwardly of the hopper, engageable with the back of the hopper to limit rearward movement of the hopper about its pivot.

4. The structure of claim 1, and a slide valve having a handle positioned rearwardly of the hopper, coacting with the discharge spout to control the flow of material through it.

5. The structure of claim 1, the discharge spout terminating at its lower end immediately above the blades of the mower and being arranged to discharge material from the hopper directly against the top sides of the rotating blades, adjacent their outer ends, whereby the material is uniformly distributed by the action of the blades.

6. The structure of claim 1, the arrangement being such that, in use, the rotary motion of the blades creates a downdraft, which assists in drawing material from the hopper, through the discharge spout, while at the same time directing such material downwardly, toward the ground, as well as radially outwardly, by the action of centrifugal force.

7. The structure of claim 6, the discharge spout having a side discharge adjacent its lower end, facing in the direction of rotation of the blades of the mower, whereby material is caused to flow in the direction of rotation of the blades as it is discharged from the hopper, through the discharge spout, the arrangement being such that the suction created by the rotary motion of the blades, acting on the material flowing from the hopper, through the discharge spout, together with the position of the side discharge, positively assure the continuous flow of such material and insure that the discharge spout will remain open to the flow of material at all times.

References Cited

UNITED STATES PATENTS

| 2,804,998 | 9/1957 | Kirschmann | 222—177 |
| 2,966,023 | 12/1960 | Carpenter | 56—25.4 |
| 3,019,945 | 2/1962 | Pattillo | 222—177 |
| 3,023,562 | 3/1962 | Slack | 56—25.4 |
| 3,100,371 | 8/1963 | Redman | 56—25.4 |

RUSSEL R. KINSEY, Primary Examiner.

U.S. Cl. X.R.

56—229, 255; 222—177